(12) United States Patent
Artzi et al.

(10) Patent No.: US 8,387,018 B2
(45) Date of Patent: Feb. 26, 2013

(54) FAULT LOCALIZATION USING DIRECTED TEST GENERATION

(75) Inventors: Shay Artzi, Brookline, MA (US); Julian Dolby, Bronx, NY (US); Marco Pistoia, Amawalk, NY (US); Frank Tip, Ridgewood, NJ (US)

(73) Assignee: International Business Machines Corporation, Armonk, NY (US)

( * ) Notice: Subject to any disclaimer, the term of this patent is extended or adjusted under 35 U.S.C. 154(b) by 349 days.

(21) Appl. No.: 12/873,816

(22) Filed: Sep. 1, 2010

(65) Prior Publication Data

US 2012/0054552 A1 Mar. 1, 2012

(51) Int. Cl.
G06F 9/44 (2006.01)
G06F 11/00 (2006.01)
(52) U.S. Cl. .................................. 717/124; 714/38.1
(58) Field of Classification Search .......... 717/124–135; 714/37, 38.1
See application file for complete search history.

(56) References Cited

U.S. PATENT DOCUMENTS

2007/0016894 A1* 1/2007 Sreedhar ................... 717/131
2008/0276228 A1* 11/2008 Sreedhar ................... 717/131

OTHER PUBLICATIONS

Korel et al., "Algorithmic Software Fault Localization," 1991, IEEE, p. 246-252.*
DeMillo et al., "Critical Slicing for Software Fault Localization," 1996, ACM, p. 121-134.*
Steinder et al., "Increasing robustness of fault localization through analysis of lost, spurious, and positive symptoms," 2002, IEEE, p. 322-331.*
Ruthruff et al., "End-User Software Visualizations for Fault Localization," 2003, ACM, p. 123-132.*
Ruthruff et al., "An Empirical Study of Fault Localization for End-User Programmers," May 2005, ACM, p. 352-361.*
Hao et al., "A Similarity-Aware Approach to Testing Based Fault Localization," Nov. 2005, ACM, p. 291-294.*
Wang et al., "Automated Path Generation for Software Fault Localization," Nov. 2005, ACM, p. 347-351.*
Guo et al., "Accurately Choosing Execution Runs for Software Fault Localization," 2006, Springer-Verlag, p. 80-95.*
Liu et al., "Failure Proximity: A Fault Localization-Based Approach," Nov. 2006, ACM, p. 46-56.*
Huang et al., "Automated Fault Localization with Statistically Suspicious Program States," Jun. 2007, ACM, p. 11-19.*
Vayani, Rafi, "Improving Automatic Software Fault Localization," Jul. 2007, Delft University of Technology, p. 1-85.*
Nessa et al., "Software Fault Localization Using N-gram Analysis," 2008, Springer-Verlag, p. 548-559.*
Wong et al., "A Crosstab-based Statistical Method for Effective Fault Localization," 2008, IEEE, p. 42-51.*
Abreu et al., "Automatic Software Fault Localization using Generic Program Invariants," Mar. 2008, ACM, p. 712-717.*
Cellier, Peggy, "Formal Concept Analysis Applied to Fault Localization," May 2008, ACM, p. 991-994.*

(Continued)

*Primary Examiner* — Wei Zhen
*Assistant Examiner* — Qing Chen
(74) *Attorney, Agent, or Firm* — Jon A. Gibbons; Fleit Gibbons Gutman Bongini & Bianco PL (57) ABSTRACT

Disclosed is a novel computer implemented system, on demand service, computer program product and a method for fault-localization techniques that apply statistical analyses to execution data gathered from multiple tests. The present invention determines the fault-localization effectiveness of test suites generated according to several test-generation techniques based on combined concrete and symbolic (concolic) execution. These techniques are evaluated by applying the Ochiai fault-localization technique to generated test suites in order to localize 35 faults in four PHP Web applications. The results show that the test-generation techniques under consideration produce test suites with similar high fault-localization effectiveness, when given a large time budget.

17 Claims, 5 Drawing Sheets

OTHER PUBLICATIONS

Jeffrey et al., "Fault Localization Using Value Replacement," Jul. 2008, ACM, p. 167-177.*
Jiang et al., "How Well Do Test Case Prioritization Techniques Support Statistical Fault Localization," 2009, IEEE, p. 99-106.*
Masri et al., "An Empirical Study of the Factors that Reduce the Effectiveness of Coverage-based Fault Localization," Jul. 2009, ACM, p. 1-5.*
Janssen et al., "Zoltar: A Spectrum-based Fault Localization Tool," Aug. 2009, ACM, p. 23-29.*
Wong et al., "A Survey of Software Fault Localization," Nov. 2009, The University of Texas at Dallas, p. 1-19.*
Zhang et al., "A Study of Relative Redundancy in Test-Suite Reduction While Retaining or Improving Fault-Localization Effectiveness," Mar. 2010, ACM, p. 2229-2236.*
Park et al., "Falcon: Fault Localization in Concurrent Programs," May 2010, ACM, p. 245-254.*
R. Abreu, et al. On the accuracy of spectrum-based fault localization. In Proceedings of Testing: Academia and Industry Conference, 2007, IEEE.
R. Abreu, et al. An evaluation of similarity coefficients for software fault localization. In PRDC 2006, pp. 39-46, 2006.
H. Agrawal, et al. Fault localization using execution slices and dataflow tests. In ISSRE, pp. 143-151, Toulouse, France, 1995.
S. Artzi, et al, editors. Practical Fault Localization for Dynamic Web Applications, 2010.
S. Artzi, et al. Finding bugs in dynamic web applications. In ISSTA, pp. 261-272, 2008.
S. Artzi, et al. Finding bugs in web applications using dynamic test generation and explicit state model checking. IEEE Transactions on Software Engineering, 2010.
B. Baudry, et al. Improving test suites for efficient fault localization. In L. J. Osterweil, H. D. Rombach, and M. L. Soffa, editors, Proceedings of the 28$^{th}$ International Conference on Software Engineering (ICSE'06), pp. 82-91. ACM, 2006.
J. Burnim et al, Heuristics for scalable dynamic test generation. In ASE, pp. 443-446. IEEE, 2008.
C. Cadar, et al. EXE: automatically generating inputs of death. In CCS, 2006.
T. M. Chilimbi, et al. Holmes: Effective statistical debugging via efficient path profiling. In Proceedings of the 31$^{st}$ International Conference on Software Engineering (ICSE'09) [1], pp. 34-44, Sep. 2008.
H. Cleve, et al. Locating causes of program failures. In ICSE, pp. 342-351, May 2005. [13] P. Godefroid, N. Klarlund, and K. Sen. DART: Directed automated random testing. In PLDI, 2005.
P. Godefroid, et al. Automated whitebox fuzz testing. In NDSS, 2008.
S. Horwitz, et al. Interprocedural slicing using dependence graphs. ACM Trans. Program. Lang. Syst., 12(1):26-60, 1990.
M. Hutchins, et al. Experiments on the effectiveness of dataflow- and control flow-based test adequacy criteria. In ICSE, pp. 191-200, 1994.
B. Jiang, et al. How well do test case prioritization techniques support statistical fault localization. In Proceedings of the 33rd Annual IEEE International Computer Software and Applications Conference (COMPSAC 2009), Jul. 2009.
J. A. Jones, et al. Empirical evaluation of the *Tarantula* automatic fault-localization technique. In ASE, pp. 273-282, 2005.
J. A. Jones, et al. Visualization of test information to assist fault localization. In ICSE, pp. 467-477, 2002.
B. Liblit, et al. Bug isolation via remote program sampling. In PLDI, pp. 141-154, 2003.
B. Liblit, et al. Scalable statistical bug isolation. In PLDI'05, pp. 15-26, 2005.
C. Liu, et al, and S. P. Midkiff. Sober: statistical model-based bug localization. In FSE, pp. 286-295, 2005.
J. Lyle, et al. Automatic program bug location by program slicing. In Proceedings of the Second International Conference on Computers and Applications, pp. 877-883, Beijing (Peking), China, 1987.
H. Pan, et al. Heuristics for automatic localization of software faults. Technical Report SERC-TR-116-P, Purdue University, Jul. 1992.
X. Ren, et al. Heuristic ranking of java program edits for fault localization. In D. S. Rosenblum and S. G. Elbaum, editors, Proceedings of the ACM/SIGSOFT International Symposium on Software Testing and Analysis (ISSTA'07), pp. 239-249. ACM, 2007.
M. Renieris and S. P. Reiss. Fault localization with nearest neighbor queries. In ASE, pp. 30-39, 2003.
R. Santelices, et al. Lightweight fault-localization using multiple coverage types. In Proceedings of the 31st International Conference on Software Engineering (ICSE'09) [1], pp. 56-66, 2009.
K. Sen, et al: CUTE: A concolic unit testing engine for C. In FSE, 2005.
M. Stoerzer, et al. Finding Failure-inducing Changes in Java Programs Using Change Classification. In FSE, pp. 57-68, Portland, OR, USA, Nov. 7-9, 2006.
F. Tip. A survey of program slicing techniques. Journal of Programming Languages, 3(3):121-189, 1995.
G. Wasserman, et al. Dynamic test input generation for web applications. In ISSTA, pp. 249-260, 2008.
C. Yilmaz, et al. Time will tell: fault localization using time spectra. In W. Schäfer, M. B. Dwyer, and V. Gruhn, editors, Proceedings of the 30$^{th}$ International Conference on Software Engineering (ICSE'08), pp. 81-90. ACM, 2008.
Y. Yu, et al. An empirical study of the effects of test-suite reduction on fault localization. In ICSE, pp. 201-210, 2008.

* cited by examiner

FAULT LOCALIZATION USING DIRECTED TEST GENERATION

STATEMENT REGARDING FEDERALLY SPONSORED RESEARCH

Not Applicable

BACKGROUND

When a test fails, developers need to find the location of the fault in the source code before they can fix the problem. In recent years, a number of automated techniques have been proposed to assist programmers with this task, which is usually called fault localization. Many fault-localization techniques attempt to predict the location of a fault by applying statistical analyses to data obtained from the execution of multiple tests (see, for example, [19, 20, 21, 18, 3, 27]). The basic idea is that a statement [19], control-flow predicate [20], or def-use pair [27] is more suspicious (or more likely to be responsible for a test failure) if it correlates strongly with failing tests, and less suspicious if it correlates strongly with passing tests.

SUMMARY

The present invention was first disclosed in a paper entitled "Directed Test Generation For Fault Localization" This paper was published at ISSTA 2010 (July 2010) and the teachings of which is incorporated by reference in its entirety.

Disclosed is a novel computer implemented system, on demand service, computer program product and a method for fault-localization techniques that apply statistical analyses to execution data gathered from multiple tests. Existing fault-localization techniques assume the availability of a test suite, and are unable to localize faults if one is not available. In this invention, the following problem is addressed: if no test suite is available to assist fault localization, what is the best approach to generate one? The present invention determines the fault-localization effectiveness of test suites generated according to several test-generation techniques based on combined concrete and symbolic (concolic) execution. These techniques are evaluated by applying the Ochiai fault-localization technique to generated test suites in order to localize 35 faults in four PHP Web applications. The results show that the test-generation techniques under consideration produce test suites with similar high fault-localization effectiveness, when given a large time budget. However, a new, "directed" test-generation technique, which aims to maximize the similarity between the path constraints of the generated tests and those of faulty executions, reaches this level of effectiveness with much smaller test suites. On average, when compared to test generation based on standard concolic execution techniques that aims to maximize code coverage, the new directed technique preserves fault localization effectiveness while reducing test-suite size by 86.1% and test-suite generation time by 88.6%.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings.

DETAILED DESCRIPTION

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawing like numerals, refer to like parts through several views.

1. Introduction

For a given application that contains a fault and a given fault localization algorithm, one way to measure a test suite's suitability for fault localization is the number of statements that must be explored until the fault is found, assuming that statements are explored in order of decreasing suspiciousness. However, as in previous work on fault localization [18, 5], this invention concentrates on the percentage of faults that are well-localized—these are faults for which less than 1% of all executed statements need to be examined until the fault is found, assuming that statements are examined in order of decreasing suspiciousness. This invention explores a number of strategies for generating test suites and measures their fault-localization effectiveness, defined as the percentage of well-localized faults for that suite. The present invention determines which test-generation strategy achieves the best tradeoff between size and effectiveness for the test suites that it generates.

The research presented in this invention was conducted in the context of Apollo [6, 7, 5], a tool that uses combined concrete and symbolic (concolic) execution [13, 28, 10, 14, 31] to generate failure-inducing inputs for PHP Web applications. Apollo currently targets two kinds of failures: (i) HTML failures, in which the application generates malformed HTML, and (ii) execution failures, which manifest themselves by a program crash or an obtrusive error message. In recent work [5], we incorporated several variations of the Tarantula fault-localization technique [19] in Apollo, and demonstrated that these can localize faults quite well using a test suite that was generated using concolic execution. However, in those previous experiments, the test suites were not generated with fault localization in mind, but with the dual objective of maximizing code coverage and finding as many failures as possible. Therefore, it is not clear whether the test suites used in [5] have maximal effectiveness for fault localization. In particular, the question is if even better fault localization can be achieved using test suites that are generated with other test-generation strategies. Furthermore, it is conceivable that the use of other test-generation strategies might enable equally effective fault localization using much smaller test suites.

In this invention, we assume a scenario where a user has just encountered a failure and where no test suite is available. For such situations, we want to answer the following question: What is the best strategy for generating a test suite that has maximal effectiveness for fault localization? Notice that the effectiveness of fault-localization techniques is premised on the availability of a high-quality test suite that provides good coverage of the application's statements. However, even 100% coverage does not guarantee good fault localization.

Consider, for example, a scenario where two statements $s_1$ and $s_2$ are executed by exactly the same tests and where Tarantula [19] or Ochiai [3] is used for fault localization. These fault-localization techniques compute a program construct's suspiciousness rating from the number of passing tests and failing tests that execute it. Hence, if $s_1$ and $s_2$ are executed by the same tests, those techniques will report them as being equally suspicious. In such cases, creating an additional test that executes $s_1$ but not $s_2$ (or vice versa) may enable better fault localization. This invention presents a number of strategies for generating tests that are parameterized by a similarity criterion, and evaluate their fault-localization effectiveness. The similarity criterion measures how similar the execution characteristics associated with two tests are, and is used to direct concolic execution towards generating tests whose execution characteristics are similar to those of a given failing test.

In one embodiment the present invention is implemented using Apollo, an automated tool that detects and localizes faults in PHPWeb applications. The test-generation techniques are evaluated by localizing 35 faults in four PHP applications. The results that we present in Section 5 show that a new, directed test-generation technique based on path-constraint similarity yields the smallest test suites with the same excellent fault-localization characteristics as test suites generated by other techniques. In particular, when compared to test generation based on the concolic execution algorithm of [5], which aims to maximize code coverage, our directed technique reduces test-suite size by 86.1% and test-suite generation time by 88.6%.

The remainder of this invention is organized as follows. Section 2 presents a motivating example. Section 3 provides details on our techniques for concolic execution and fault localization. Section 4 presents the similarity criteria with which our directed test generation algorithms are parameterized. Section 5 presents the implementation and experimental results.

2. Example

Listing 1 shows a simple PHP script that scales one point to have the same magnitude as another. Object-oriented code in PHP resembles code in C++ or Java. The point class in Listing 1 declares two fields, x and y. Also declared in class point are methods magnitude( ), which computes the distance of a point from the origin, and scale( ), which scales a point to have the same magnitude as an argument point. Two PHP features of particular note are the isset( ) construct for checking whether a variable has been defined, and the $_REQUEST associative array, which is used to access input values that were provided to a PHP script.

The script code that follows the class definition in Listing 1 creates a point object and then initializes its x and y fields with values x and y that were provided as inputs to the script by accessing $_REQUEST. The program then calls isset( ) to check if input values scale_x and scale_y have been provided to the script. If so, the program creates and initializes the point $scale by which to scale the point $x. The intended use of this script is to be given two points, and scale one of them according to the other. There are two issues with this code:

1. This scaling is not well defined for the origin, which causes a division by zero in the scale( ) method in that case. We will assume that the desired fix for this is to leave the origin point unscaled. Note that the division by zero is a warning rather than an error in PHP, and so execution continues using a default value—0 in this case—as the "result" of the division.
2. There is also an inconsistency if the scaling parameters are not provided: In this case, the scale point will not be created, but it will be used anyway, resulting in attempting to call magnitude( ) on a non-object. This error aborts the PHP script, and execution ceases at that point. We will assume that, in the absence of the scale_x and scale_y parameters, the intended behavior is not to scale the point.

Our fault-localization procedure assumes that we have some test—either written by hand or generated by some technique, possibly

```
<?php
1 error_reporting( E_ALL);
2
3 class point {
4 var $x;
5 var $y;
6
7 function magnitude( ) {
8 return sqrt($this->x*$this->x+$this->y*$this->y);
9 }
10
11 function scale($p) {
12 $factor = $p->magnitude( ) / $this->magnitude( );
13 $this->x = $this->x * $factor;
14 $this->y = $this->y * $factor;
15 }
16 };
17
18 $x = new point( );
19 $x->x = $_REQUEST['x'];
20 $x->y = $_REQUEST['y'];
21
22 if (isset($_REQUEST['scale_x']) &&
23   isset($_REQUEST['scale_y'])) {
24 $scale = new point( );
25 $scale->x = $_REQUEST['scale_x'];
26 $scale->y = $_REQUEST['scale_y'];
27 }
28
29 $x->scale($scale);
30
31 print $x->x." ".$x->y." ".$x->magnitude( )."\n";
?>
```

Listing 1: Example PHP Program with Bugs

Apollo—that exposes a given failure. There are many tests that could reveal these failures, and so the following ones are chosen arbitrarily.

1. The first fault can be revealed by any choice of inputs that defines the scale_x and scale_y parameters and uses 0 for both x and y. In this case, the if test will succeed, and so the script will call scale( ). Then the call to magnitude( ) on $this in scale( ) will return 0, triggering the divide-by-zero failure.
2. The second fault can be revealed by any input that does not define either scale_x or scale_y or both. In this case, the if test will fail, causing the code that creates and initializes $scale not to execute. In this case, the script will try to scale $x by the undefined $scale, resulting in an error when it tries to access a field of the undefined value.

3. Approach

This section describes in detail our solution for directed test generation for fault localization.

3.1 Concolic Testing

We begin by briefly reviewing the combined concrete and symbolic execution algorithm as embodied in Apollo [5]. The idea of this algorithm is to execute an application on some initial input

```
        parameters: Program P, Seed Input I_0
        result      : Tests T;
        T : setOf(<input,output>)
1       T := ∅;
2       toExplore := getConfigs(I_0):
3       while toExplore ≠ ∅ && !timeExpired( ) do
4           input := selectionMethodology.nextInput(toExplore);
5           output := executeConcrete(P,input);
6           T := T ∪ {<input,output>};
7           toExplore := toExplore ∪ getConfigs(input);
8       return B;
9       Subroutine getConfigs(input):
10      configs := ∅;
11      c_1 ∧ ... ∧ c_n := executeSymbolic(S_0,P,input);
12      foreach i = 1,...,n do
13          newPC := c_1 ∧ ... ∧ c_{i-1} ∧¬ c_i;
14          input := solve(newPC);
15          if input ≠ ⊥ then
16              enqueue(configs, <newPC,input>);
17      return configs;
```

Listing 2: A Simplified Test-generation Algorithm (e.g., an arbitrarily or randomly chosen input), and then on additional inputs obtained by solving constraints derived from exercised control-flow paths that capture the execution's dependency on program input.

Listing 2 shows the simplified pseudocode of our test-generation algorithm. The full algorithm can be found in [7], FIG. 6. The inputs to the algorithm are a program P, and an initial seed input (for simplicity the seed input parameter is singular, but in practice it is possible to supply a set of seed inputs). The output of the algorithm is a set of tests. Each test is a pair in which the first element is an input to the program, and the second element is the corresponding output.

The algorithm uses a set of configurations. Each configuration is a pair of a path constraint and an input. A path constraint is a conjunction of conditions on the program's input parameters. The configuration set is initialized with the configurations derived from the seed input (which can be the empty input) (line 2). The program is executed concretely on the input (line 5). Next, the algorithm uses a subroutine, getConfigs, to find new configurations. First, the program is executed symbolically on the same input (line 11). The result of symbolic execution is a path constraint, $\hat{}_{i=1}^{n} c_i$, which is satisfied by the path that was just executed from entry to exit of the whole program. The subroutine then creates new inputs by solving modified versions of the path constraint (lines 12-16), as follows: For each prefix of the path constraint, the algorithm negates the last conjunct (line 13). A solution to such an alternative path constraint, if it exists, corresponds to an input that will execute the program along a prefix of the original execution path, and then take the opposite branch, presumably covering new code. In other words, in this basic approach test generation is directed towards maximizing branch coverage. The algorithm uses a constraint solver (the solve auxiliary function) to find an input satisfying the given path constraint, or returns ⊥ if no satisfying input exists (line 14).

As can be seen at line 4, the test-generation algorithm is parameterized by a selection methodology, which selects the next configuration to explore during the test generation. We use the selection methodology to direct the test generation for our needs. For instance, if the selection methodology is based on a similarity criterion, the test generation will be directed towards generating similar tests.

The program in Listing 1, illustrates test generation starting from an input that exhibits the first bug, x=0, y=0, scale_x=1, scale_y=3. This will execute all statements, and reveal the path constraint isset(scale_x)^isset(scale_y). One possible next step is to negate the second path constraint, resulting in a new path constraint isset(scale_x)^ ¬ isset (scale_y). An input that would satisfy these constraints is x=4, y=0, scale_x=3, since this leaves scale_y undefined as required. There are other possible choices, clearly, but this is one way to generate a new different input. These inputs will appear later as F and B3 in the fault localization example in Table I.

This mechanism is essentially a search over different inputs that result in different executions embodied in different tests. Thus, each step involves a choice of what execution to try next. Based on these choices, the set of generated tests will be different, and these differences may affect the results of fault localization.

3.2 Fault Localization

We focus on fault-localization techniques that compare the statements executed by passing and failing tests to estimate what statements are likely responsible for faults. A wide range of techniques has been proposed [19, 20, 21, 3, 27], but we focus on the Ochiai metric, which defines the suspiciousness of a statement j, s j, as follows:

$$s_j = \frac{a_{11}}{\sqrt{(a_{11} + a_{01}) \times (a_{11} + a_{10})}}$$

using the terminology of [3]. Here $a_{11}$ is the number of failing tests that executed statement j, $a_{01}$ is the number of failing tests that did not execute statement j, $a_{10}$ is the number of passing tests that executed statement j. The idea is that statements are to be inspected in order of decreasing suspiciousness.

Based on our experience in prior work [5], the present invention augments the notion of statement used in much prior fault-localization work. Previous work has focused on some representation of source location (e.g., line number); we generalize this to a tuple consisting of a line number and possibly one of two other components:

An abstraction of the return value of the statement, if it is a function call

The conditional value for if and switch statements

We use these tuples in exactly the same way as statements are used in prior work; we apply the Ochiai formula to the set of tuples from each execution, rather than to the set of statements.

3.3 Localization Example

To illustrate the impact of the test suite on fault localization, consider the two test suites in Table I, each with four tests. These two test suites were generated by starting from a failing test F:

x=0, y=0, scale_x=1, scale_y=3 which exposes the first bug. Since the executions are determined by the inputs, we start by showing the sets of inputs for each test suite.

Because the first test suite defines the two scale parameters for all four tests, all tests will execute all of the code; tests F and A1 will expose the divide-by-zero failure. And because we record return values as well, differences are detectable in the executions of the tests. In particular, the magnitude( ) method returns a value, so

TABLE I

Example test suites

| test | args |
|---|---|
| test suite 1 | |
| F | x = 0, y = 0, scale_x = 1, scale_y = 3 |
| A1 | x = 0, y = 0, scale_x = 3, scale_y = 2 |
| A2 | x = 5, y = 0, scale_x = 1, scale_y = 0 |
| A3 | x = 3, y = 2, scale_x = 2, scale_y = 4 |
| test suite 2 | |
| F | F x = 0, y = 0, scale_x = 1, scale_y = 3 |
| B1 | x = 3 |
| B2 | x = 5, y = 4 |
| B3 | x = 4, y = 0, scale_x = 3 | tests generate different tuples for that method when it is called on points with different magnitudes. Note also that 22 is the line of the if statement, so its statements are augmented with the conditional outcome. This is illustrated in Table II.

TABLE II

Example test suite 1 executions

| test | statements executed |
|---|---|
| F | 18, 19, 20, <22, true>, 23, 24, 25, 26, 29, 12, <8, 3.1>, <8, 0>, 13, 14, 31, <8, 0> |
| A1 | 18, 19, 20, <22, true>, 23, 24, 25, 26, 29, 12, <8, 3.6>, <8, 0>, 13, 14, 31, <8, 0> |
| A2 | 18, 19, 20, <22, true>, 23, 24, 25, 26, 29, 12, <8, 1>, <8, 8.6>, 13, 14, 31, <8, 1> |
| A3 | 18, 19, 20, <22, true>, 23, 24, 25, 26, 29, 12, <8, 3.6>, <8, 3.6>, 13, 14, 31, <8, 3.6> |

Consider the calls to p.magnitude( ) in Table II; recall that we are recording both the statement itself and its return value. There are two of the four tests that execute this statement and get a result of 0. Looking at the Ochiai formula, we see that it is of suspiciousness 1, since $a_{11}=1$ and $a_{10}=a_{01}=0$. Indeed, one way to fix this issue is to handle the case when this call returns 0. This result and the lower suspiciousness for all other statements is shown in Table III.

On the other hand, for the second test suite, only the given test F exhibits the bug. And also only F executes the call to scale( ), so we see many more statements that are correlated with the bug. This is shown in Table IV and Table V, where statements 23, 24, 25, 26, 12, 13, 14 and 31 all correspond exactly to the failing test.

Thus, we observe that, especially for small test suites, the choice of tests can make a big difference. Our work focuses on selection strategies that allow us to focus fault localization quickly.

4. Similarity Metrics

This invention evaluates various strategies for automatic test generation for the purpose of fault localization. Given a failing execution, the general intuition behind our techniques is that localizing the corresponding fault is more effective if a passing test is generated whose characteristics are "similar" to those of the failing execution, because that maximizes the chances that the fault is correlated with the difference between the path constraints of the generated passing test and those of the faulty execution; the smaller the difference, the higher the precision with which the fault can be localized.

For this to be more precise, we need to formalize the concept of "similarity" between two executions. This leads us to introducing a similarity criterion, which is a function that takes as an input two executions, and produces as output a percentage index that indicates how similar the two executions are. More formally, if E is the set of all the executions of a program, a similarity criterion is a function $\sigma_\alpha: E \times E \to [0, 100]$, where $\alpha$ is itself a function that abstracts executions. Specifically, $\alpha$ maps each execution $e \in E$ to a set of characteristics of e that depend on the particular similarity metric under consideration. There can be multiple similarity criteria, each based on what characteristics are considered when measuring similarity and, consequently, what abstraction function $\alpha$ is being considered.

TABLE III

Example test suite 1 suspiciousness

| statement | executions | suspiciousness |
|---|---|---|
| 12 | F, A1, A2, A3 | .71 |
| 13 | F, A1, A2, A3 | .71 |
| 14 | F, A1, A2, A3 | .71 |
| 18 | F, A1, A2, A3 | .71 |
| 19 | F, A1, A2, A3 | .71 |
| 20 | F, A1, A2, A3 | .71 |
| 23 | F, A1, A2, A3 | .71 |
| 24 | F, A1, A2, A3 | .71 |
| 25 | F, A1, A2, A3 | .71 |
| 26 | F, A1, A2, A3 | .71 |
| 29 | F, A1, A2, A3 | .71 |
| 31 | F, A1, A2, A3 | .71 |
| <22, true> | F, A1, A2, A3 | 1 |
| <8, 0> | F, A1 | 0 |
| <8, 1> | A3 | .71 |
| <8, 3.1> | F | .5 |
| <8, 3.6> | F, A2 | 0 |
| <8, 8.6> | A2 | |

TABLE IV

Example test suite 2 executions

| test | statements executed |
|---|---|
| F | 18, 19, 20, <22, true>, 23, 24, 25, 26, 29, 12, <8, 3.1>, <8, 0>, 13, 14, 31, <8, 0> |
| B1 | 18, 19, 20, <22, false>, 29, 12 |
| B2 | B2 18, 19, 20, <22, false>, 29, 12 |
| B3 | B3 18, 19, 20, <22, false>, 29, 12 |

A similarity criterion $\sigma_\alpha$ can be extended to a function $\sigma'_\alpha: E \times 2^E \to [0,100]$, defined as follows:

$$\sigma'_\alpha(e, S) := \max_{e' \in F}(\sigma_\alpha e'), \forall e \in E, \forall F \subseteq E$$

which can be used to compare a passing execution with a set of failing executions.

In order to guide our test generation technique (Section 3.1) towards generating similar executions, a similarity function is used as the selection methodology (Listing 2, line 4). The selection methodology is responsible for selecting the next input to explore, thus directing the generation to explore similar executions.

In this invention, two different similarity metrics are considered: path constraints and inputs. These two approaches and the relevant similarity criteria are described in the next subsections.

4.1 Path-Constraint Similarity

In general, any execution is generated by a set of inputs to the program. This defines a function $f: 2^I \to E$, where I is the set of inputs to the program. Function $f$ maps any set of program inputs to one program execution. Furthermore, given a particular set of program inputs L∈I, a heuristic function can compute an input from a given path constraint. This defines a function $g:2^P \to 2^I$, where P is the set of path constraints that can arise during the execution of the program. The composition function $f \circ g: 2^P \to E$ can be used to base a similarity criterion on path constraints instead of actual executions, which is a very useful property in test generation. Specifically, given a set $\pi$ of path constraints and the corresponding execution $e = f(g(\pi))$, we define $\alpha(e) = \pi$, and we use the resulting function $\alpha: E \to 2^P$ to parameterize the similarity criterion $\alpha$.

TABLE V

Example test suite 2 suspiciousness

| statement | execution | suspiciousness |
|---|---|---|
| 12 | F, B1, B2, B3 | .5 |
| 13 | F | 1 |
| 14 | F | 1 |
| 18 | F, B1, B2, B3 | .5 |
| 19 | F, B1, B2, B3 | .5 |
| 20 | F, B1, B2, B3 | .5 |
| 23 | F | 1 |
| 24 | F | 1 |
| 25 | F | 1 |
| 26 | F | 1 |
| 29 | F, B1, B2, B3 | .5 |
| 31 | F | 1 |
| <22, true> | F | 1 |
| <22, false> | B1, B2, B3 | 0 |
| <8, 0> | F | 1 |
| <8, 3.1> | F | 1 |

Two techniques for path-constraint similarity have been implemented: subset comparison and subsequence comparison. With subset comparison, execution similarity is computed based on the cardinality of the largest subset of identically evaluating conditional statements that are traversed in the two executions; with subsequence comparison, execution similarity is computed based on the cardinality of the largest subsequence of conditions that evaluate to the same value in both executions.

To better understand the difference between these two metrics, consider for example two program executions $e_1, e_2 \in E$ that evaluate conditions ⟨ $C_1, C_2, C_3, C_4, C_5, C_6$ ⟩ and assume that condition $C_3$ evaluates to true in $e_1$ and false in $e_2$, but C1, C2, C3, C4, V5, C6 evaluate to the same Boolean value in both executions. In this case, $\sigma_\alpha(e_1, e_2) = 83.3\%$ if the similarity criterion is based on subset comparison, and $\sigma_\alpha(e_1, e_2) = 50\%$ if the similarity criterion is based on subsequence comparison. In practice, we observed that these two similarity metrics lead to very similar results. Therefore, in the remainder of this invention, we concentrate only on path constraint similarity based on subset comparison.

4.2 Input Similarity

With this approach, we compare the inputs to different executions. Each execution e∈E is reduced to only its inputs, as follows. Given a set $\pi$ of path constraints, we consider the corresponding set of execution inputs $g(\pi)$, and we define $\alpha(e) = g(\pi)$. We then use the resulting function $\alpha: E \to 2^I$ to parameterize the similarity criterion $\sigma$.

Input similarity is based on subset comparison: the similarity between two executions is computed based on the number of inputs that are identical for both executions. For example, consider two executions $e_1$ and $e_2$ with inputs ⟨ $S_1, S_2, S_3, S_4, S_5, S_6$ ⟩ and ⟨ $T_1, T_2, T_3, T_4, T_5, T_6$ ⟩, respectively, such that $S_3 \neq T_3$, but $S_i = T_i$, $\forall i \neq 3$. In this case, $\sigma_\alpha(e_1, e_2) = 83.3\%$.

Example

The example in Listing 1 motivates the use of different similarity criteria for fault-localization-oriented test generation. Since the sample program only exhibits three different paths, a test-generation technique based on input similarity is more effective for fault localization.

Let us assume that the program in Listing 1 fails with inputs given in F, where F is defined as in Table I. By looking at test suites A and B in Table I, we observe that test suite A, generated with the input-similarity technique, allows for quick fault localization. This is due to the fact that the faulty statement in the program is executed by multiple failing tests in suite A, namely F and A1. Even more importantly, suite A has the advantage of presenting a passing test, A2, that is similar to the failing execution F.

If all the tests in the A and B suites are available, A1 will be the first test to be selected with the input-similarity strategy since it is the most similar to the faulty execution F that is given as input to the algorithm. That will be followed by test A2, which is the second test to be the most similar to the faulty execution. A2 will be followed by A3. Notice that both A2 and A3 are passing tests. This makes it possible to localize and isolate the faulty statement with a test-suite size of only 4. In contrast, the coverage strategy would get full coverage with F, and then would select random tests, with a potential test-suite size of 7, before making the fault localizable.

4.3 Overall Flow Diagram

Figure 1A:
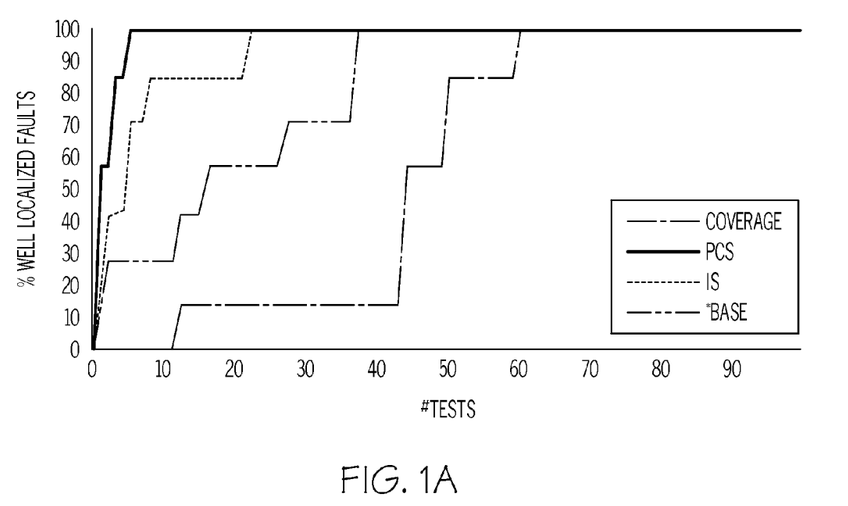
FIG. 1 is a series of graphs for Average number of statements to inspect for all the execution failure found in each subject program: (a) faqforge, (b) schoolmate, (c) phpsysinfo, (d) webchess, and (e) aggregated.
Figure 1B:
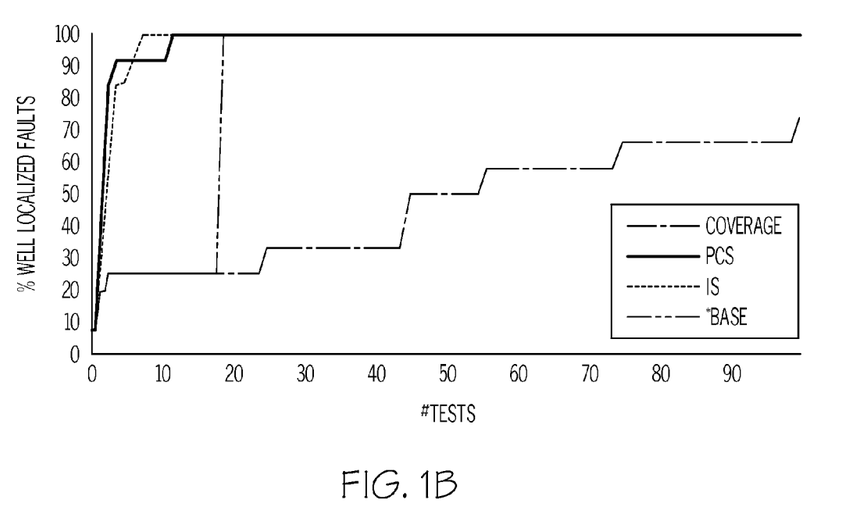
Figure 1C:
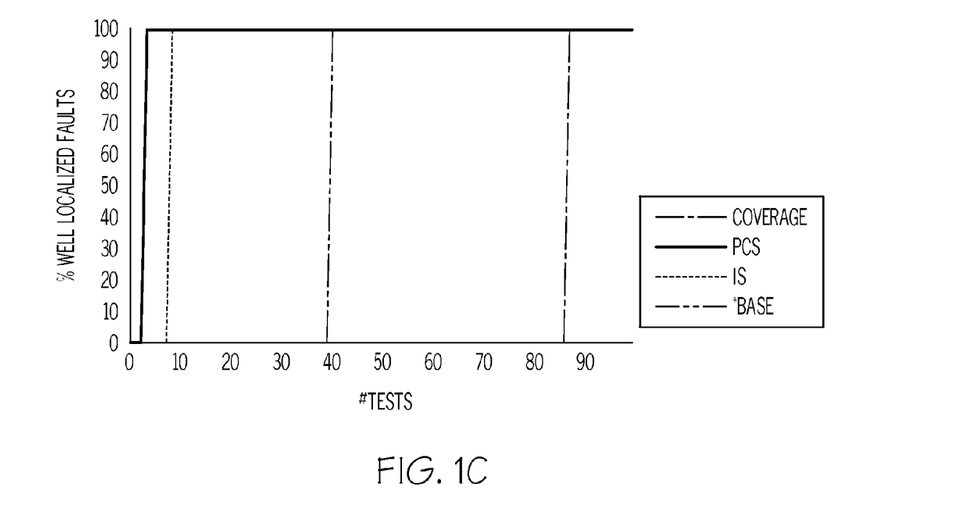
Figure 1D:
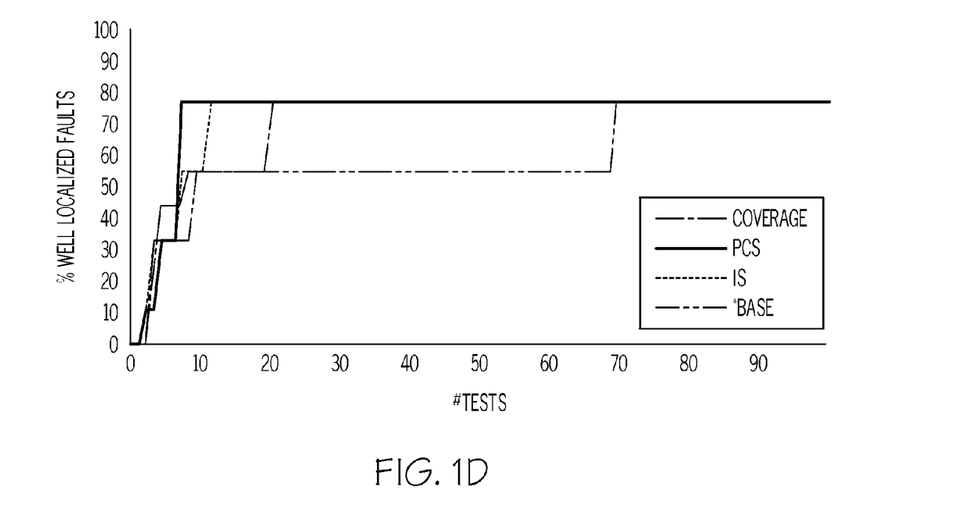
Figure 1E:
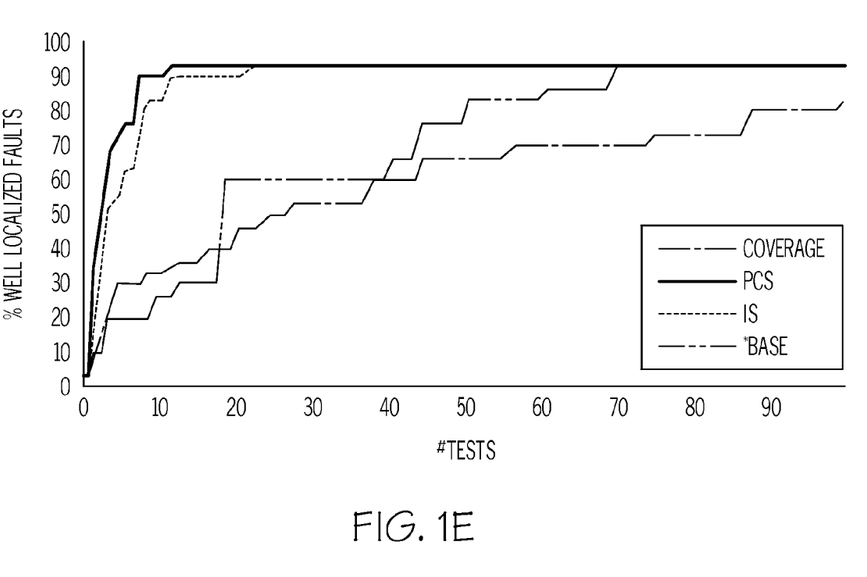
Figure 2:
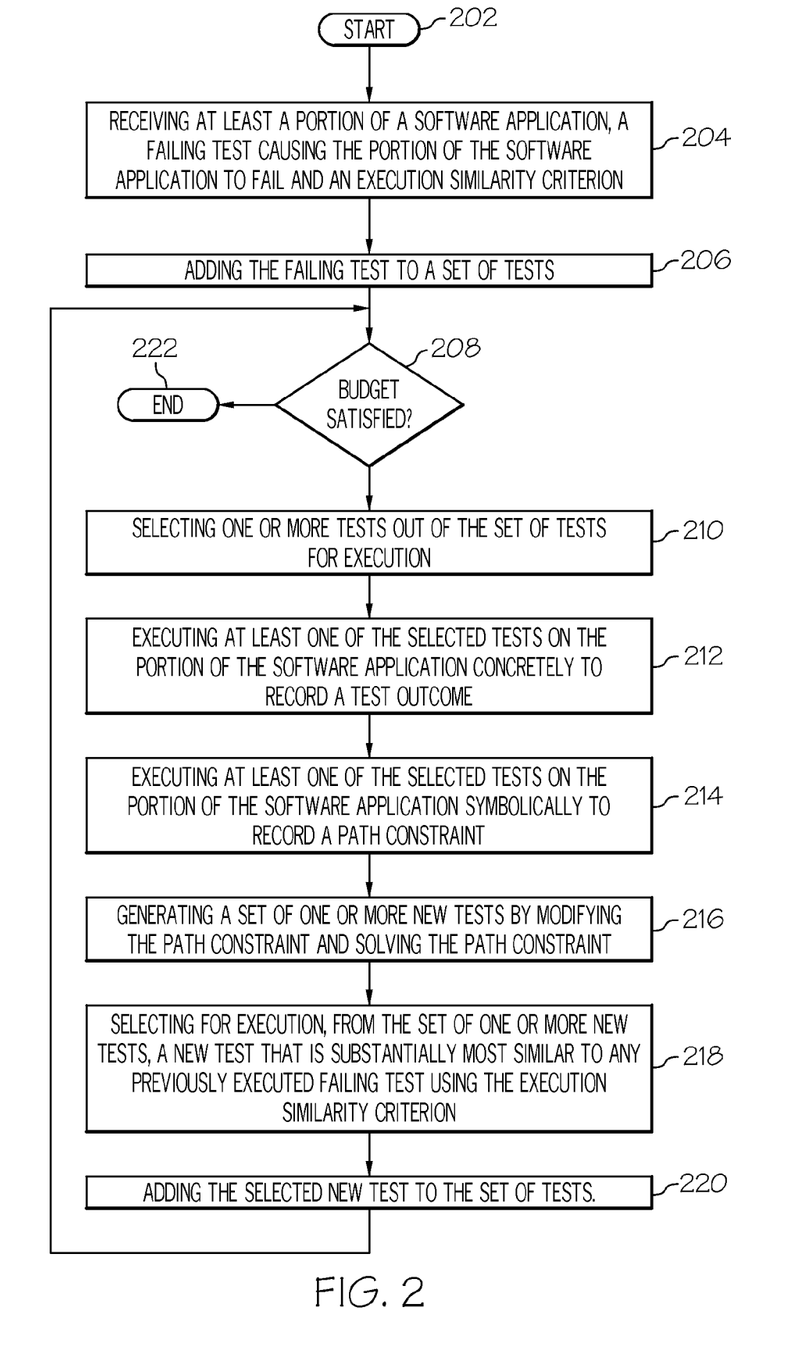
FIG. 2 is an example flow diagram of a computer-implemented method for localizing faults in an application of the present invention.
Figure 3:
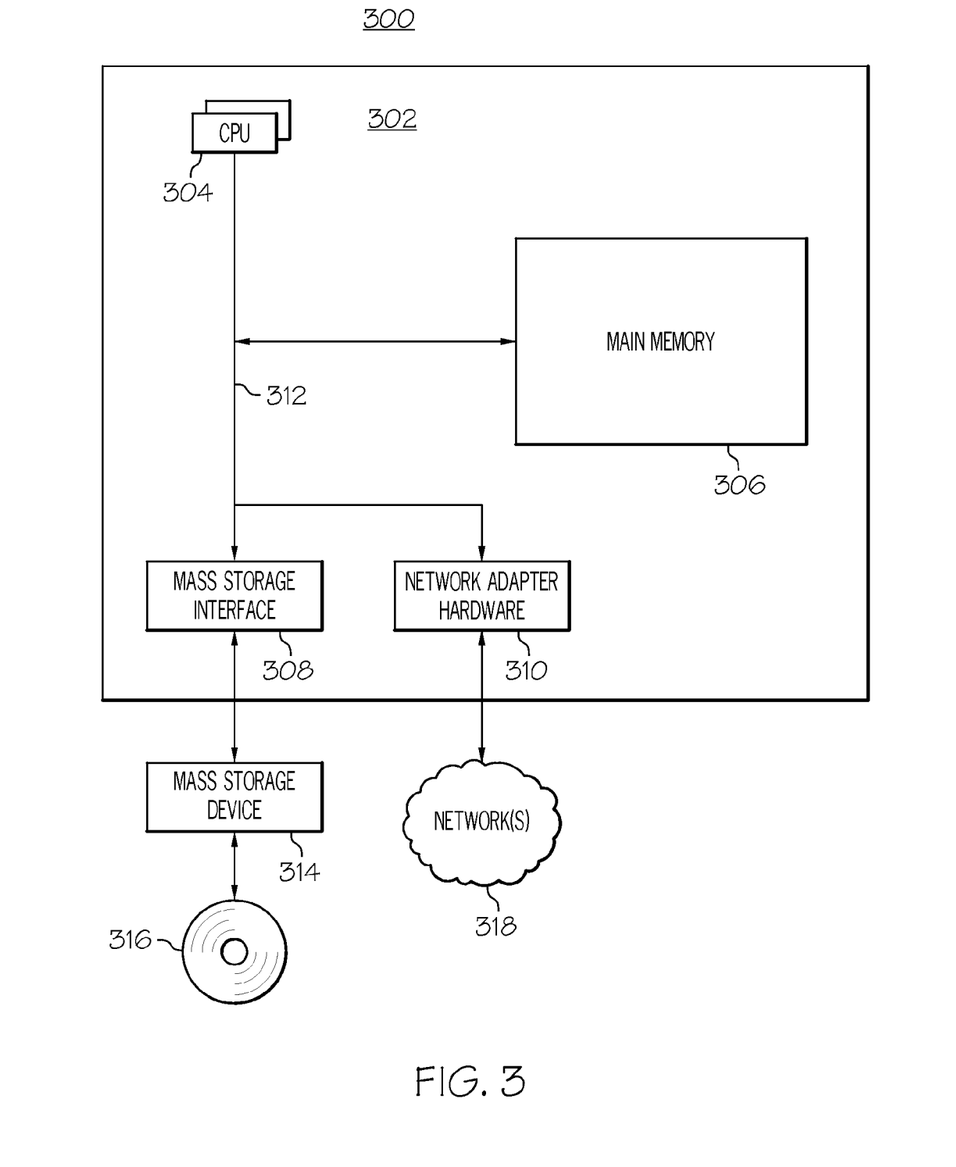
FIG. 3 is a block diagram of a computer system useful for implementing the software steps of the present invention.

Referring now to FIG. 2, the flowchart, and FIG. 3, the block diagram, illustrating an example architecture, functionality, and operation of possible implementations of systems, on-demand processes, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The flow to generate a test suite for fault localization in a software application begins in step 202 and immediately proceeds to step 204. Three items are received in step 204 as follows: i) a software application or at least a portion of a software application; ii) a failing test causing the portion of the software application to fail; and iii) an execution similarity criterion. Next in step 204, the failing test received is added to a set of test. Now an iterative loop is entered in steps 208-222. The loop executes as least once and ends after a budget is reached such as a time budget or a computation budget or after all the tests in the set of test have been executed in the loop at least once. The flow ends in step 222. In one embodiment, it is important to note that the failing test that has been received has been executed against the portion of the software application which has not been previously tested.

The loop includes step 210 where one or more tests out of the set of tests for execution are selected. Next in step 214, at least one of the selected tests on the portion of the software application is executed concretely to record a test outcome.

Continuing with step 216, at least one of the selected tests on the portion of the software application is executed symbolically to record a path constraint. Now, in step 216 a set of one or more new tests is generated by modifying the path constraint and solving the path constraint. In step 218, a new test is selected that is substantially most similar to any previously executed failing test using the execution similarity criterion. In one embodiment, the execution similarity criterion is a path constraint similarity. And in another embodiment, the execution similarity criterion is an input similarity. Yet, still wherein the execution similarity criterion is a coverage-based similarity criterion. Finally in step 220, the new selected test is added to the set of tests and the flow continues up to step 208 until the budget is exhausted or satisfied.

5. Implementation and Evaluation

Several test-generation strategies are implemented in Apollo [6, 5], a tool for automatically finding and localizing faults in PHP web applications. This section reports on the implementation, and on experiments that measure the effectiveness of the different test generation strategies.

5.1 Implementation

For the purpose of test generation, we use Apollo [6, 7], which employs a shadow interpreter based on the Zend PHP Interpreter V5.2.22. Apollo (see http://www.php.net/) simultaneously performs concrete program execution using concrete values, and a symbolic execution that uses symbolic values that are associated with variables. Furthermore, Apollo uses the choco (see http://choco-solver.net) constraint solver to solve path constraints during the concolic generation. The process of concolic execution is orchestrated by a standard Apache Web server (see http://www.apache.org/) that uses the instrumented PHP interpreter.

Our fault-localization technique performs conditional [5] and return value modeling. These two enhancements where implemented on top of Apollo's shadow interpreter. For the conditional modeling, Apollo records all comparisons in the executed PHP script. For each comparison, the shadow interpreter stores the statement's line number and the relevant Boolean result. For a switch statement, the shadow interpreter stores the line number of the switch and the set of results for all executed case blocks. For return-value modeling, the shadow interpreter stores the line number of the call, and an abstract model of the value. The model allows the fault localization technique to distinguish between null and non-null values, zero and non-zero int and double values, true and false Boolean values, constant and non-constant values, as well as empty and non-empty arrays, strings, and resources.

TABLE VI

Characteristics of subject programs.

| Program | version | #files | PHP LOC | #downloads |
|---|---|---|---|---|
| faqforge | 1.3.2 | 19 | 734 | 14,164 |
| webchess | 0.9.0 | 24 | 2,226 | 32,352 |
| Schoolmate | 1.5.4 | 63 | 4,263 | 4,466 |
| Phpsysinfo | 2.5.3 | 73 | 7,745 | 495,217 |

The #files column lists the number of .php and .inc files in the program.
The PHP LOC column lists the number of lines that contain executable PHP code.
The #downloads column lists the number of downloads (see http://sourceforge.net).

5.2 Research Questions

For each of the test-generation strategies under consideration, we are interested in determining the maximal fault-localization effectiveness that can be achieved using test suites generated according to that strategy. As in previous work on fault localization, we will concentrate on the percentage of well-localized faults for which less than 1% of all executed statements need to be examined until the fault is found, assuming that statements are examined in order of decreasing suspiciousness. It is reasonable to expect that a limited amount of time will be available for test generation. Therefore, we are also interested in determining how quickly each of the test-generation strategies under consideration converges towards its maximal effectiveness. This leads us to formulate the following research questions:

RQ1. What is the maximal fault-localization effectiveness of test suites, measured as the percentage of well-localized faults, generated by each of the test-generation strategies?

RQ2. How many tests need to be generated by each test-generation strategy in order to reach its maximal fault-localization effectiveness?

5.3 Subject Programs

For the evaluation, we selected four open-source PHP programs from (http://sourceforge.net)

faqforge is a tool for creating and managing documents
webchess is an online chess game
schoolmate is a PHP/MySQL solution for administering elementary, middle, and high schools
phpsysinfo is a utility for displaying system information, such as uptime, CPU, memory, etc.

Table VII presents some characteristics of these programs.

5.4 Methodology

In order to answer our research questions, we needed localized faults. Actual faults are used that were discovered by Apollo [6, 7]. In our previous work, Apollo was used to discover two types of failures: HTML failures that occur when malformed HTML is generated, and execution failures when an input causes a crash or obtrusive error message. In this invention, we restrict our attention to execution failures for which the location of the fault is not immediately obvious from an error message. The reason for restricting our attention to these cases is that, in our opinion, these are the situations where the use of an automated fault localization is most warranted.

All faults are manually localized. For each fault, a patch is devised to ensure that applying this patch fixed the problem, by running the test again and making sure that the associated failures had been corrected. Table VIII summarizes the number of faults for each subject program.

TABLE VIII

Number of faults used in the localization experiments.

| subject | # faults |
|---|---|
| webchess | 10 |
| faqforge | 7 |
| schoolmate | 16 |
| phpsysinfo | 2 |
| total | 35 |

Each fault manifested itself as an execution failure running the tests again, and making sure that the associated failures had been corrected. Table VIII summarizes the number of faults for each subject program.

The following four test-generation strategies are used to generate test suites used for fault localization:

Base Test generation using the concolic execution algorithm of [7], which starts from an empty input, and aims to maximize branch coverage. This algorithm is called Base because it will serve as the baseline for comparison with the new similarity-based directed generation algorithms.

Coverage Test generation using the concolic execution algorithm of [7], but starting test generation from the failing test.

PCS (Path Constraint Similarity) Test generation using the subset based path-constraint similarity metric that was described in Section 4.1

IS (Input Similarity) Test generation using the input similarity that was described in Section 4.2.

For each strategy and for each fault we used Apollo to generate test suites. Then, for each test suite and each localized fault, suspiciousness ratings is computed for all executed statements according to the Ochiai technique [3] with the improvements described in Section 3.2. Similar to previous fault-localization studies [19, 12, 18, 27], the effectiveness of a fault localization algorithm is measured as the minimal number of statements that need to be inspected until the first faulty line is detected, assuming that statements are examined in order of decreasing suspiciousness. The number of statements to be inspected as a percentage of the number of executed statements is computed. Finally, we computed the percentage of faults that are "well-localized", meaning that they require the inspection of less than 1% of all executed statements.

5.5 RQ1

We first discuss the "maximal" fault-localization effectiveness of the test suites generated by the four test-generation techniques above, as measured by the percentage of well-localized faults, assuming each technique is given a infinite amount of time to construct a test suite. In practice, we found that it sufficed to have each technique generate 100 tests for each fault, with the exception of schoolmate, which required 252 tests to reach a plateau. Generating more tests beyond this point resulted in larger test suites, but not in an increased number of well-localized faults. To be complete, it is theoretically possible that some minor further gains could be achieved by generating many additional tests, but we consider this to be very unlikely. Table IX shows three columns for each subject program and each technique. These columns show, from left to right: (i) on average, for each subject program, the percentage of faults that is well-localized, (ii) on average, the absolute number of statements that needs to be inspected to localize each fault, and (iii) on average, the percentage of executed statements that needs to be inspected to localize each fault. For example, for faqforge, both the Base and PCS techniques eventually localize 100% of the faults to within 1% of all executed statements. Furthermore, on average, each of these faults is localized by these techniques to 4.6 statements, which corresponds to 0.6% of all executed statements. The Coverage and IS generation techniques also reach 100% well-localized faults on faqforge eventually, albeit a slightly higher plateau of 5 and 5.1 statements, respectively, that need to be inspected, which corresponds to 0.7% of all executed statements.

TABLE IX

Summary, for each test generation technique and subject program, of the percentage of faults that is well-localized, and the absolute number (# stmts) and percentage (% stmts) of executed statements that need to be inspected on average until the fault is localized.

| program | Base | | | Coverage | | | PCS | | | IS | | |
| --- | --- | --- | --- | --- | --- | --- | --- | --- | --- | --- | --- | --- |
| | % wl | # stmts | % stmts | % wl | # stmts | % stmts | % wl | # stmts | % stmts | % wl | # stmts | % stmts |
| webchess | 77 | 11.3 | 1.3 | 77 | 16.4 | 1.9 | 77 | 16.9 | 1.9 | 77 | 16.8 | 1.9 |
| faqforge | 100 | 4.6 | 0.6 | 100 | 5 | 0.7 | 100 | 4.6 | 0.6 | 100 | 5.1 | 0.7 |
| schoolmate | 100 | 11.4 | 0.4 | 100 | 6.8 | 0.2 | 100 | 4.6 | 0.2 | 100 | 4.6 | 0.2 |
| phpsysinfo | 100 | 17 | 0.7 | 100 | 17 | 0.7 | 100 | 14 | 0.6 | 100 | 14 | 0.6 |
| Average | 100 | 11.1 | 0.75 | 100 | 11.3 | 0.9 | 100 | 10 | 0.83 | 100 | 10.1 | 0.85 |

In summary, the test-generation strategies are capable of generating test suites with nearly identical maximal fault-localization effectiveness when given an infinite amount of time. In particular, for faqforge, schoolmate and phpsysinfo, 100% of all faults was eventually well-localized by each technique. However, for webchess, only 77% of all faults was eventually well-localized by each technique.

5.6 RQ2

As we have seen, the different test generation techniques eventually achieve very similar effectiveness. However, the question remains to what extent the test generation techniques require a different number of tests to reach this plateau. Table 3 shows two columns for each subject program and each test generation technique. These columns show, from left to right: (i) the number of tests that is needed to reach the maximal percentage of well-localized faults as reported in Table 2, and (ii) the time required to generate these tests. Here, it should be noted that the time reported in (ii) is an average over all faults for the Coverage, PCS, and IS techniques. For the Base technique, there is just one test suite that is used for all faults, and the time reported is the time needed to generate that test suite.

As can be seen in Table 3, there are significant difference in how quickly the different test generation techniques converge on the optimal result. For faqforge, the Base test generation technique that we used in [5] requires 60 tests to reach the maximal percentage of well-localized faults, whereas the PCS technique requires only 5 tests. The amount of time required to generate a test suite differs similarly, with 63.6 seconds for the Base technique and only 7.3 seconds for the PCS technique. The graphs in FIG. 1 provide some more detail on how quickly the test generation strategies converge towards their maximal effectiveness. Each graph shows the percentage of well-localized faults plotted against the number of generated tests, for each of the generation techniques. By examining the graphs, we can observe that the directed strategies (IS and PCS) converge much faster than the undirected strategies (Coverage and Base). In three of the four subject programs (webchess, faqforge, and phpsysinfo), the PCS strategy is superior. In the case of schoolmate, however, the IS strategy (7 tests) is slightly better than PCS (11 tests).

On the whole, we conclude that the PCS strategy is the preferred technique. On average, PCS requires only 6.5 tests to achieve the optimal number of well-localized faults, versus 46.8 tests for the Base strategy that we used in our previous work [5]. This can be viewed an improvement of ((46.8−6.5)_100)/46.8=86.1% Similarly, we notice that, on average, the Base strategy takes 131.2 seconds for test generation, compared to only 14.9 seconds required by PCS, for an improvement of 88.6%.

TABLE X

Summary, for each test generation technique and subject program, of the time (time(s) for Base and avg time(s) for Coverage, PCS and IS) and number of tests (# tests) required to achieve the maximal percentage of well-localized faults, as reported in Table IX.

| program | # tests | Base time(s) | # tests | Coverage time(s) | # tests | PCS time(s) | # tests | IS time(s) |
|---|---|---|---|---|---|---|---|---|
| webchess | 69 | 78.9 | 20 | 22.7 | 7 | 12.3 | 11 | 15.3 |
| faqforge | 60 | 63.6 | 37 | 47.5 | 5 | 7.3 | 22 | 28.9 |
| schoolmate | 18 | 20.1 | 253 | 386.2 | 11 | 14.9 | 7 | 9.4 |
| phpsysinfo | 40 | 362.3 | 87 | 818 | 3 | 25.2 | 8 | 68.4 |
| average | 46.8 | 131.2 | 99.2 | 318.6 | 6.5 | 14.9 | 12 | 30.7 |

The present invention can be extended to explore additional similarity metrics, and understand how they compare to the path-constraint and input similarity metrics presented in this invention.

6. On Demand Deployment

The fault localization using directed test generation application process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

7. Non-Limiting Hardware Embodiments

FIG. 3 is a block diagram of a computer system useful for implementing the software steps of the present invention.

FIG. 3 is a block diagram illustrating a more detailed view of a computer system or information processing system 300, useful for implementing the fault localization using directed test generation application of FIG. 2. The information processing system 300 is based upon a suitably configured processing system adapted to implement one or more embodiments of the present invention. Similarly, any suitably configured processing system can be used as the information processing system 300 by embodiments of the present invention.

The information processing system 300 includes a computer 302. The computer 302 has a processor(s) 304 that is connected to a main memory 306, mass storage interface 308, and network adapter hardware 310 coupled to network 318. A system bus 312 interconnects these system components. The main memory 306, in one embodiment, comprises the fault localization using directed test generation application of FIG. 2. (or at least a portion discussed above.

Although illustrated as concurrently resident in the main memory 306, it is clear that respective components of the main memory 306 are not required to be completely resident in the main memory 306 at all times or even at the same time. In one embodiment, the information processing system 300 utilizes conventional virtual addressing mechanisms to allow programs to behave as if they have access to a large, single storage entity, referred to herein as a computer system memory, instead of access to multiple, smaller storage entities such as the main memory 306 and data storage device 316. Note that the term "computer system memory" is used herein to generically refer to the entire virtual memory of the information processing system 306.

The mass storage interface 308 is used to connect mass storage devices, such as mass storage device 314, to the information processing system 300. One specific type of data storage device is an optical drive such as a CD/DVD drive, which may be used to store data to and read data from a computer readable medium or storage product such as (but not limited to) a CD/DVD 316. Another type of data storage device is a data storage device configured to support, for example, NTFS type file system operations.

Although only one CPU 304 is illustrated for computer 302, computer systems with multiple CPUs can be used equally effectively. Embodiments of the present invention further incorporate interfaces that each includes separate, fully programmed microprocessors that are used to off-load processing from the CPU 304. An operating system (not shown) included in the main memory is a suitable multitasking operating system such as any of the Linux, UNIX, Windows, and Windows Server based operating systems. Embodiments of the present invention are able to use any other suitable operating system. Some embodiments of the present invention utilize architectures, such as an object oriented framework mechanism, that allows instructions of the components of operating system (not shown) to be executed on any processor located within the information processing system 300. The network adapter hardware 310 is used to provide an interface to a network 334. Embodiments of the present invention are able to be adapted to work with any data communications connections including present day analog and/or digital techniques or via a future networking mechanism.

Although the exemplary embodiments of the present invention are described in the context of a fully functional computer system, those of ordinary skill in the art will appreciate that various embodiments are capable of being distributed as a program product via CD or DVD, e.g. CD 316, CD ROM, or other form of recordable media, or via any type of electronic transmission mechanism.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

8. References

Each of the following thirty-three references are hereby incorporated by reference in their entirety.

[1] 31st International Conference on Software Engineering, ICSE 2009, May 16-24, 2009, Vancouver, Canada, Proceedings. IEEE, 2009.

[2] R. Abreu, P. Zoeteweij, and A. J. van Gemund. On the accuracy of spectrum-based fault localization. In Proceedings of Testing: Academia and Industry Conference—Practice and Research Techniques (TAIL PART '07), pages 89-98, September 2007.

[3] R. Abreu, P. Zoeteweij, and A. J. C. van Gemund. An evaluation of similarity coefficients for software fault localization. In PRDC 2006, pages 39-46, 2006.

[4] H. Agrawal, J. R. Horgan, S. London, and W. E. Wong. Fault localization using execution slices and dataflow tests. In ISSRE, pages 143-151, Toulouse, France, 1995.

[5] S. Artzi, J. Dolby, F. Tip, and M. Pistoia, editors. Practical Fault Localization for Dynamic Web Applications, 2010. To appear. [6] S. Artzi, A. Kie'zun, J. Dolby, F. Tip, D. Dig, A. Paradkar, and M. D. Ernst. Finding bugs in dynamic web applications. In ISSTA, pages 261-272, 2008.

[7] S. Artzi, A. Kie'zun, J. Dolby, F. Tip, D. Dig, A. Paradkar, and M. D. Ernst. Finding bugs in web applications using dynamic test generation and explicit state model checking. IEEE Transactions on Software Engineering, 2010. To appear.

[8] B. Baudry, F. Fleurey, and Y. L. Traon Improving test suites for efficient fault localization. In L. J. Osterweil, H. D. Rombach, and M. L. Soffa, editors, Proceedings of the $28^{th}$ International Conference on Software Engineering (ICSE'06), pages 82-91. ACM, 2006.

[9] J. Burnim and K. Sen. Heuristics for scalable dynamic test generation. In ASE, pages 443-446. IEEE, 2008.

[10] C. Cadar, V. Ganesh, P. M. Pawlowski, D. L. Dill, and D. R. Engler. EXE: automatically generating inputs of death. In CCS, 2006.

[11] T. M. Chilimbi, B. Liblit, K. K. Mehra, A. V. Nori, and K. Vaswani. Holmes: Effective statistical debugging via efficient path profiling. In Proceedings of the $31^{st}$ International Conference on Software Engineering (ICSE'09) [1], pages 34-44.

[12] H. Cleve and A. Zeller. Locating causes of program failures. In ICSE, pages 342-351, May 2005. [13] P. Godefroid, N. Klarlund, and K. Sen. DART: Directed automated random testing. In PLDI, 2005.

[14] P. Godefroid, M. Y. Levin, and D. Molnar. Automated whitebox fuzz testing. In NDSS, 2008.

[15] S. Horwitz, T. Reps, and D. Binkley. Interprocedural slicing using dependence graphs. ACM Trans. Program. Lang. Syst., 12(1):26-60, 1990.

[16] M. Hutchins, H. Foster, T. Goradia, and T. Ostrand. Experiments of the effectiveness of dataflow- and control-flow-based test adequacy criteria. In ICSE, pages 191-200, 1994.

[17] B. Jiang, Z. Zhang, T. Tse, and T. Y. Chen. How well do test case prioritization techniques support statistical fault localization. In Proceedings of the 33rd Annual IEEE International Computer Software and Applications Conference (COMPSAC 2009), July 2009.

[18] J. A. Jones and M. J. Harrold. Empirical evaluation of the Tarantula automatic fault-localization technique. In ASE, pages 273-282, 2005.

[19] J. A. Jones, M. J. Harrold, and J. Stasko. Visualization of test information to assist fault localization. In ICSE, pages 467-477, 2002.

[20] B. Liblit, A. Aiken, A. X. Zheng, and M. I. Jordan. Bug isolation via remote program sampling. In PLDI, pages 141-154, 2003.

[21] B. Liblit, M. Naik, A. X. Zheng, A. Aiken, and M. I. Jordan. Scalable statistical bug isolation. In PLDI'05, pages 15-26, 2005.

[22] C. Liu, X. Yan, L. Fei, J. Han, and S. P. Midkiff. Sober: statistical model-based bug localization. In FSE, pages 286-295, 2005.

[23] J. Lyle and M. Weiser. Automatic bug location by program slicing. In Proceedings of the Second International Conference on Computers and Applications, pages 877-883, Beijing (Peking), China, 1987.

[24] H. Pan and E. H. Spafford. Heuristics for automatic localization of software faults. Technical Report SERC-TR-116-P, Purdue University, July 1992.

[25] X. Ren and B. G. Ryder. Heuristic ranking of java program edits for fault localization. In D. S. Rosenblum and S. G. Elbaum, editors, Proceedings of the ACM/SIGSOFT International Symposium on Software Testing and Analysis (ISSTA'07), pages 239-249. ACM, 2007.

[26] M. Renieris and S. P. Reiss. Fault localization with nearest neighbor queries. In ASE, pages 30-39, 2003.

[27] R. Santelices, J. A. Jones, Y. Yu, and M. J. Harrold. Lightweight fault-localization using multiple coverage types. In Proceedings of the 31st International Conference on Software Engineering (ICSE'09) [1], pages 56-66.

[28] K. Sen, D. Marinov, and G. Agha. CUTE: A concolic unit testing engine for C. In FSE, 2005.

[29] M. Stoerzer, B. G. Ryder, X. Ren, and F. Tip. Finding Failure-inducing Changes in Java Programs Using Change Classification. In FSE, pages 57-68, Portland, Oreg., USA, Nov. 7-9, 2006.

[30] F. Tip. A survey of program slicing techniques. Journal of Programming Languages, 3(3):121-189, 1995.

[31] G. Wassermann, D. Yu, A. Chander, D. Dhurjati, H. Inamura, and Z. Su. Dynamic test input generation for web applications. In ISSTA, pages 249-260, 2008.

[32] C. Yilmaz, A. M. Paradkar, and C. Williams. Time will tell: fault localization using time spectra. In W. Schafer, M. B. Dwyer, and V. Gruhn, editors, Proceedings of the $30^{th}$ International Conference on Software Engineering (ICSE'08), pages 81-90. ACM, 2008.

[33] Y. Yu, J. A. Jones, and M. J. Harrold. An empirical study of the effects of test-suite reduction on fault localization. In ICSE, pages 201-210, 2008.

What is claimed is:

1. A computer-implemented method to generate a test suite for fault localization in a software application, the computer-implemented method comprising:
receiving at least a portion of a software application, a failing test causing the portion of the software application to fail and an execution similarity criterion;
adding the failing test to a set of tests;
performing the following at least once includes repeating until at least one of a time budget and a computational budget is exhausted:
selecting one or more tests out of the set of tests for execution;
executing at least one of the selected one or more tests on the portion of the software application concretely to record a test outcome;
executing at least one of the selected one or more tests on the portion of the software application symbolically to record a path constraint;
generating a set of one or more new tests by modifying the path constraint and solving the path constraint;
selecting for execution, from the set of one or more new tests, a new test that is substantially most similar to any previously executed failing test using the execution similarity criterion; and
adding the selected new test to the set of tests.

2. The computer-implemented method of claim 1, wherein the performing the following at least once includes repeating until all the tests in the set of tests have been selected and executed at least once.

3. The computer-implemented method of claim 1, wherein the execution similarity criterion is a path constraint similarity.

4. The computer-implemented method of claim 1, wherein the execution similarity criterion is an input similarity.

5. The computer-implemented method of claim 1, wherein the execution similarity criterion is a coverage-based similarity criterion.

6. The computer-implemented method of claim 1, wherein the failing test that has been received has been executed against the portion of the software application which has not been previously tested.

7. A computer program product for analyzing an application comprising a plurality of code fragments, the computer program product comprising:
a non-transitory computer readable storage medium readable by a computer system, wherein the non-transitory computer readable storage medium stores software programming instructions capable of performing with a processor programming code to carry out:
receiving at least a portion of a software application, a failing test causing the portion of the software application to fail and an execution similarity criterion;
adding the failing test to a set of tests;
performing the following at least once includes repeating until at least one of a time budget and a computational budget is exhausted:
selecting one or more tests out of the set of tests for execution;
executing at least one of the selected one or more tests on the portion of the software application concretely to record a test outcome;
executing at least one of the selected one or more tests on the portion of the software application symbolically to record a path constraint;
generating a set of one or more new tests by modifying the path constraint and solving the path constraint;
selecting for execution, from the set of one or more new tests, a new test that is substantially most similar to any previously executed failing test using the execution similarity criterion; and
adding the selected new test to the set of tests.

8. The computer program product of claim 7, wherein the performing the following at least once includes repeating until all the tests in the set of tests have been selected and executed at least once.

9. The computer program product of claim 7, wherein the execution similarity criterion is a path constraint similarity.

10. The computer program product of claim 7, wherein the execution similarity criterion is an input similarity.

11. The computer program product of claim 7, wherein the execution similarity criterion is a coverage-based similarity criterion.

12. The computer program product of claim 7, wherein the failing test that has been received has been executed against the portion of the software application which has not been previously tested.

13. A system for analyzing an application comprising a plurality of code fragments, the system comprising:
a computer memory capable of storing machine instructions; and
a processor in communication with said computer memory, wherein said processor is capable of accessing said machine instructions to perform:
receiving at least a portion of a software application, a failing test causing the portion of the software application to fail and an execution similarity criterion;
adding the failing test to a set of tests;

performing the following at least once includes repeating until at least one of a time budget and a computational budget is exhausted:
  selecting one or more tests out of the set of tests for execution;
  executing at least one of the selected one or more tests on the portion of the software application concretely to record a test outcome;
  executing at least one of the selected one or more tests on the portion of the software application symbolically to record a path constraint;
  generating a set of one or more new tests by modifying the path constraint and solving the path constraint;
  selecting for execution, from the set of one or more new tests, a new test that is substantially most similar to any previously executed failing test using the execution similarity criterion; and
  adding the selected new test to the set of tests.

14. The system of claim 13, wherein the performing the following at least once includes repeating until all the tests in the set of tests have been selected and executed at least once.

15. The system of claim 13, wherein the execution similarity criterion is a path constraint similarity.

16. The system of claim 13, wherein the execution similarity criterion is an input similarity.

17. The system of claim 13, wherein the execution similarity criterion is a coverage-based similarity criterion.

* * * * *